United States Patent

Ma

[11] Patent Number: 5,319,582
[45] Date of Patent: Jun. 7, 1994

[54] DETACHABLE PORTABLE PERSONAL COMPUTER

[76] Inventor: Hsi K. Ma, 4F., No. 48, Sec. 2, Chung Cherng Rd., Taipei, Taiwan

[21] Appl. No.: 769,214

[22] Filed: Oct. 1, 1991

[30] Foreign Application Priority Data

Jul. 12, 1991 [CN] China .................... 91 218274.1

[51] Int. Cl.⁵ ............................................ G06F 1/00
[52] U.S. Cl. ............................ 364/708.1; 345/169
[58] Field of Search ............... 364/708; 340/706, 709, 340/710

[56] References Cited

U.S. PATENT DOCUMENTS

| | | | |
|---|---|---|---|
| 4,680,674 | 7/1987 | Moore | 364/708 X |
| 4,704,604 | 11/1987 | Fuhs | 364/708 X |
| 4,733,229 | 3/1988 | Whitehead | 340/709 X |
| 4,749,364 | 6/1988 | Arney et al. | 364/708 X |
| 4,764,763 | 8/1988 | Wickstead et al. | 340/709 |
| 4,926,365 | 5/1990 | Hsieh | 364/708 |
| 4,949,080 | 8/1990 | Mikan | 340/706 X |
| 5,103,376 | 4/1992 | Blonder | 364/708 X |

Primary Examiner—Tan V. Mai
Attorney, Agent, or Firm—Bacon & Thomas

[57] ABSTRACT

A detachable portable personal computer includes an upper unit pivotably electrically connected to a bottom unit. The upper unit includes a liquid crystal display, a motherboard, a printer interface, and RS-232 interface and cathod ray tube interface, an integrated circuit card, a mouse, a keyboard interface and a power supply card. The bottom unit includes a keyboard, a power supply unit, a hard disk drive and a floppy disk drive. The top unit can be connected to the keyboard to form a word processor or, the top and bottom unit can be connected into a notebook computer, the top and bottom units can be detached from each other for use independently.

4 Claims, 2 Drawing Sheets

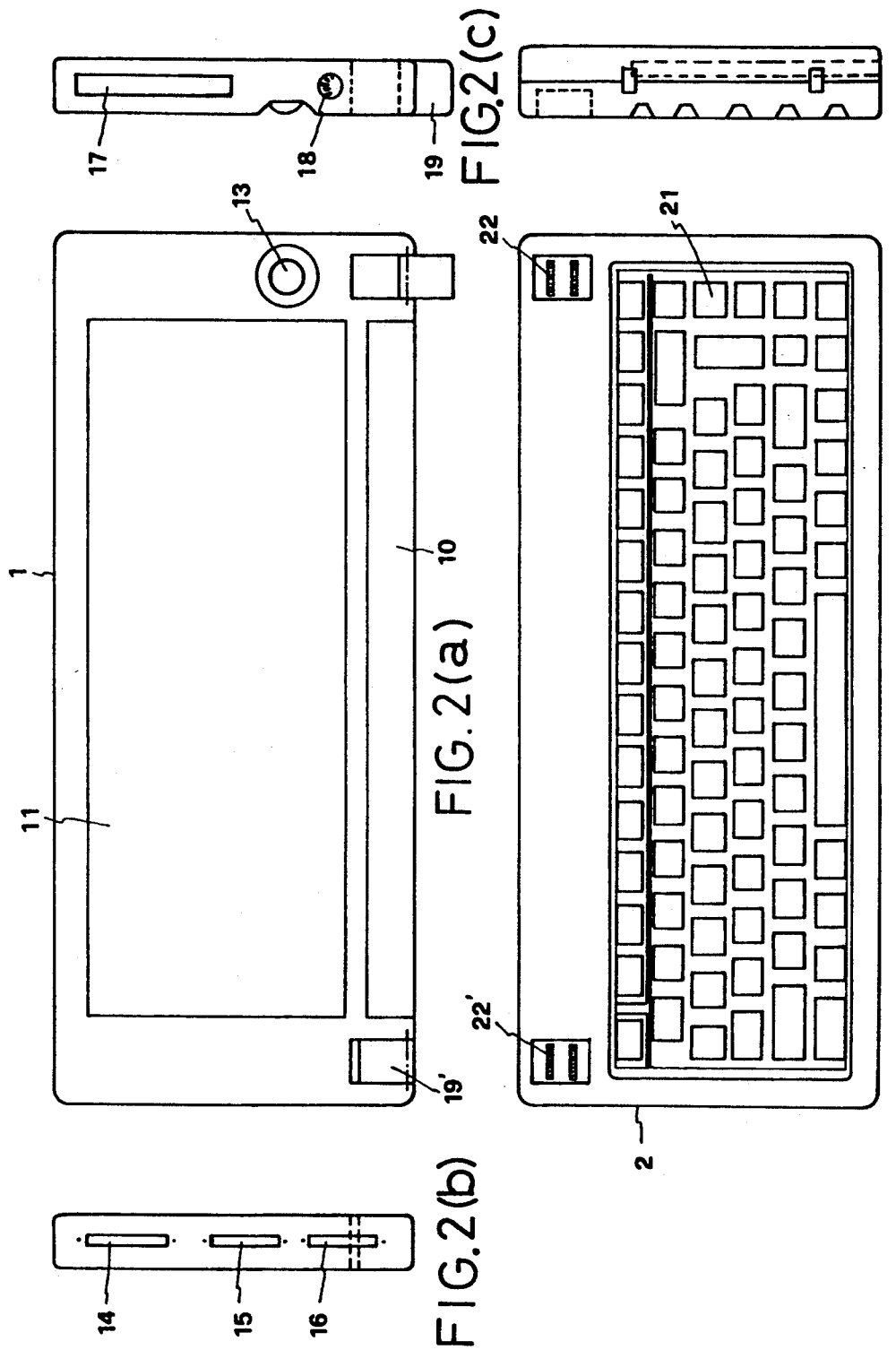

DETACHABLE PORTABLE PERSONAL COMPUTER

BACKGROUND OF THE INVENTION

In recent years, because of the fast development in electronic technology, computer have become faster in operation and more compact in structure. Because they are high performance, low cost and easy to carry, portable personal computers have become more and more popular. In recent years, various types of notebook personal computers have been disclosed to greatly reduce space occupation. A notebook personal computer may be as small as 5 cms in thickness. According to the known structures, a notebook personal computer is generally made in a fixed structure, i.e., the mainframe, the keyboard and the related peripheral equipments are fixedly connected into a unitary device. In some occasions, one may need to use only part of the whole assembly of a portable personal computer. However, because a portable personal computer is not detachable, the whole assembly must be taken along even if only a part of the computer is to be used.

SUMMARY OF THE INVENTION

The present invention has been accomplished to eliminate the above-described problems. It is therefore the main object of the present invention to provide a detachable portable personal computer which is comprised of two separate units detachably connected together to form a complete portable personal computer, the two separate units being detachable from each other for use either as a notebook personal computer or an independent input device.

BRIEF DESCRIPTION OF THE DRAWINGS

FIG. 2, comprising FIGS. 2a-2c, illustrates the arrangement of the upper unit; and FIG. 3, comprising FIGS. 3a-3b, illustrates the arrangement of the bottom unit.

DETAILED DESCRIPTION OF THE PREFERRED EMBODIMENT

Figure 1:
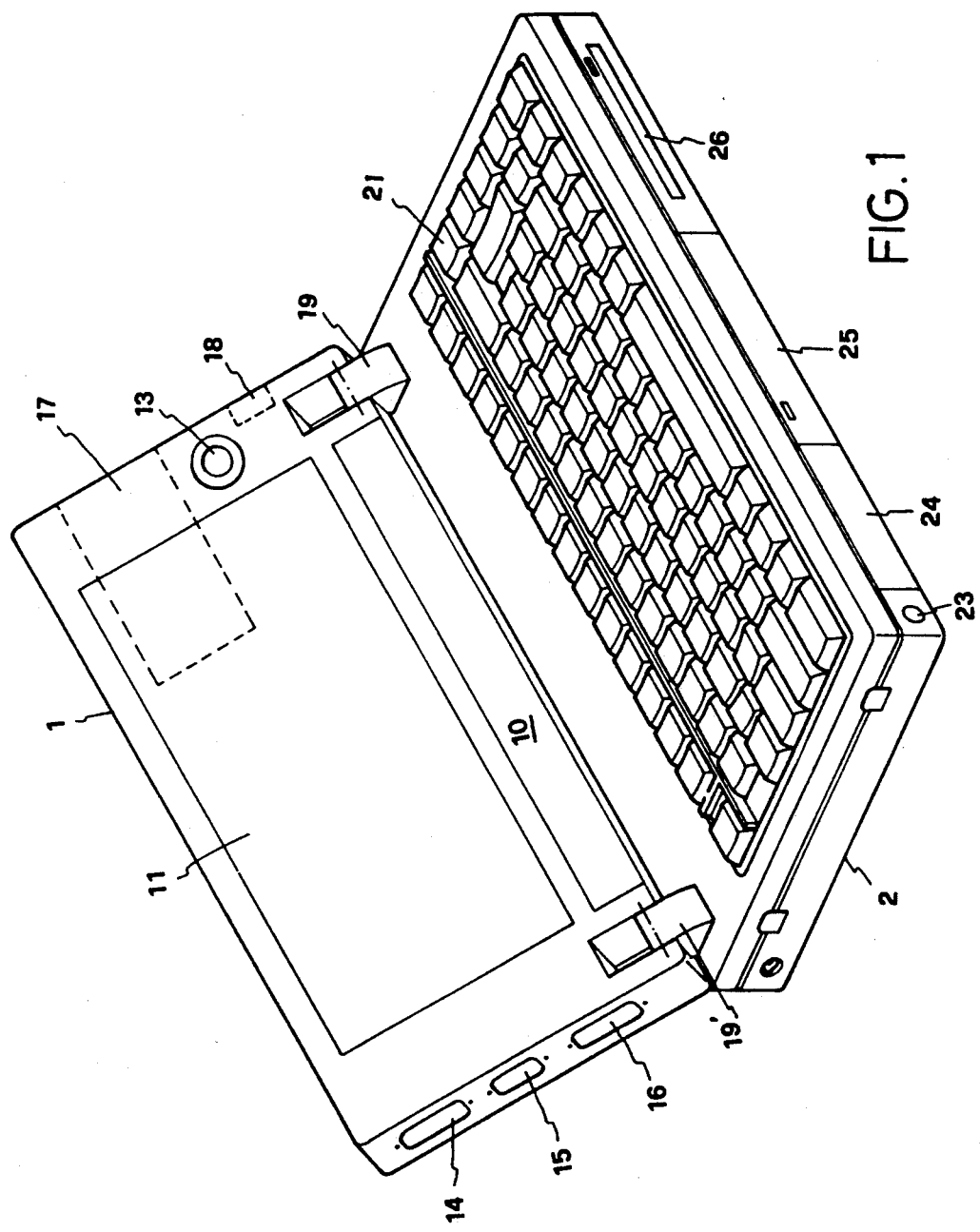
FIG. 1 is a perspective view of the preferred embodiment of the present invention.

Referring to the annexed drawings in detail, therein illustrated is the preferred embodiment of the detachable, portable personal computer of the present invention which is generally comprised of an upper unit 1 and a bottom unit 2.

The upper unit 1 is a flat, hollow, enclosed body, having a liquid crystal (LCD) display 11 on the face thereof at the middle of which is a touch screen. A motherboard 12 (not shown) is fastened inside the upper unit 1 beneath the LCD display 11. A track ball 13 is fastened in the upper unit 1 on the face thereof by the LCD display 11 for data input. A printer input/output interface (I/O) 14, and RS-232 interface (I/O) 15 and a cathode ray tube (CRT) 16 are fastened in the upper unit 1 at one end and respectively connected to the motherboard 12 while an integrated circuit (IC) card 17 and a keyboard (I/O) interface are fastened in the upper unit 1 at an opposite end and respectively connected to the motherboard 12. There is also provided a battery 10 inside the upper unit 1 at a lower position (not shown). As indicated, the upper unit 1 can be used as a handheld computer. The upper unit 1 further comprises two pivot joints 19 and 19' on the bottom edge thereof at two opposite ends pivotably detachably connected to two connectors 22 on the bottom unit 2, which pivot joints 19 and 19' each has a connector fastened therein for connecting the circuits between the top and bottom units 1 and 2.

The bottom unit 2 has a keyboard 21 and two connectors 22 and 22' on the top, wherein the connectors 22 and 22' are provided for connecting the pivot joints 19, and 19' permitting the circuits between the top and bottom units 1 and 2 to be electrically connected. Below the keyboard 21, there are provided an AC-DC power supply 23, a battery set 24, a hard disk drive 25 and a floppy disk drive 26 electrically connected into an operational mode.

By fastening the pivot joints 19 and 19' in the connectors 22 and 22', the upper unit 1 and the bottom unit 2 are connected to form a notebook computer (see FIG. 1).

The upper unit 1 may be detached from the bottom unit 2 and separately used as a hand held computer which is compact and light and more east to carry. Through the control of the trackball 13, the LCD display 11 is operated. By means of suitable connectors, the upper unit 1 may be connected to the keyboard of another computer system.

The bottom unit 2 may be separately used as a data input device or connected to a computer mainframe to form a portable computer terminal.

By connecting the right-side pivot joint 19 to the right-side connector 22, the keyboard 21 is connected to the upper unit 1 forming a compact personal computer or word processor. The left-sided pivot joint 19' may be further connected to the left-side connector 22' to connect the AC-DC power supply 23, the battery set 24, the hard disk drive 25 and the floppy disk drive 26 so as to form into a complete notebook computer.

As indicated, the present invention is to provide a detachable, portable computer which is comprised of an upper unit and a bottom unit that can be alternatively used as a hand held computer, a work processor or a notebook computer. However, it is to be understood that the drawings are designed for purposes of illustration only, and are not intended as a definition of the limits and scope of the invention disclosed.

What is claimed is:

1. A detachable portable personal computer comprising:

an upper unit having a liquid crystal display, and data input means for permitting a user to input data and commands, a motherboard fastened at an inside of the upper unit, interface means for electrically connecting said upper unit to an external device, an integrated circuit card, a keyboard interface and a power supply respectively fastened at two opposite ends of the upper unit and electrically connected together, and two pivot joints located on a bottom edge of the upper unit at two opposite ends;

a bottom unit comprising a keyboard at a top of the bottom unit, a power supply, a disc drive fastened below said keyboard, and first and second connectors at a top of the bottom unit at two corners of the bottom unit;

means for electrically connecting said upper unit to said bottom unit upon fastening said two pivot joints in said first and second connectors to form a complete notebook computer; and means for detaching said upper unit from said bottom unit for use separately from said bottom unit.

2. A detachable portable personal computer as claimed in claim 1, wherein said input means comprises a trackball mounted on a front face of said upper unit.

3. A detachable portable personal computer as claimed in claim 1, wherein said input means is a touch screen for the liquid crystal display.

4. A detachable portable personal computer as claimed in claim 1, wherein said interface means comprises a printer interface, a cathode ray tube interface, and an RS-232 interface.

* * * * *